Figure 1:
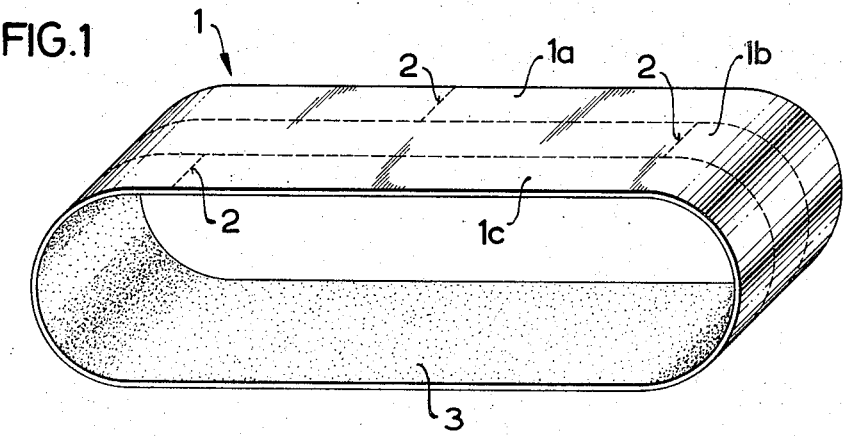

United States Patent [19]
Gersbeck

[11] 3,850,093
[45] Nov. 26, 1974

[54] STEEL BELT FOR A ROTARY PRESS
[75] Inventor: Rolf Gersbeck, Hannover, Germany
[73] Assignee: Hermann Berstorff Maschinenbau GmbH, Hannover-Kleefeld, Germany
[22] Filed: Feb. 8, 1973
[21] Appl. No.: 330,750

[30] Foreign Application Priority Data
Feb. 12, 1972 Germany............................ 2206710

[52] U.S. Cl............... 100/93 RP, 100/151, 425/373
[51] Int. Cl........................ B02c 11/08, B30b 15/34
[58] Field of Search.... 100/93 RP, 38, 92, 151–154; 425/373; 165/133

[56] References Cited
UNITED STATES PATENTS
3,266,169  8/1966  Smith, Jr......................... 165/133 X
FOREIGN PATENTS OR APPLICATIONS
485,242  5/1938  Great Britain.................. 100/93 RP

*Primary Examiner*—Peter Feldman
*Attorney, Agent, or Firm*—Donald D. Jeffery

[57] ABSTRACT
A dark coloured heat-absorbing layer provided on the inner face of an endless steel belt in a rotary press for continuous pressing of materials to provide uniform absorption of heat by the belt from the heating means.

4 Claims, 2 Drawing Figures

STEEL BELT FOR A ROTARY PRESS

The invention relates to steel belts for rotary presses.

Rotary presses incorporating endless steel belts can be used for continuous pressing of chip-wood plates or for continuous vulcanising and/or hardening and cross-linking of webs of rubber and synthetic plastics material.

Such steel belts may be formed from a steel strip with its ends welded together transversely and, in order to obtain a working width of, for example, 2.50 m, may be formed by longitudinally welding together several narrow steel belts. The welds are subsequently ground smooth on the inner and outer faces of the belt to obtain smooth surfaces for the belt.

Steel belts formed by welding together several narrow steel belts, have a high tensile strength; however, they also have the disadvantage that their inner faces do not have a uniform reflecting capacity, that is to say the smoothly polished welds are brighter than the remainder and therefore they reflect heat radiations more strongly. The several welded-together narrow steel belts may themselves have different reflection capacities and may also have marks on them.

The heat reflection and therefore the heat transmission of the steel belts, thus is non-uniform during heating by means of radiation heating means, and material to be pressed in the rotary press is heated non-uniformly. Consequently, during, for example, continuous vulcanisation of rubber webs, a web portion which lies adjacent a brightly polished weld of the endless steel belt will be vulcanised to a lesser degree than a web portion which lies adjacent another portion of the endless steel belt and weak portions of the web may thus be produced.

In the case of continuous pressing of chips to form a chip-wood plate, portions of the plate which lay adjacent a weld of the endless steel belt during pressing may be visibly distinguishable on the finished chip-wood plate, because these places were subjected to a lower temperature during pressing.

According to the invention there is provided on an endless steel belt in a rotary press for continuous pressing of chip-wood plates, or for continuous vulcanising and/or hardening and cross-linking of rubber and syntheric plastics material webs, where material to be treated is pressed between the endless steel belt and a heated rotating drum, a dark coloured heat-absorbing coating provided on the inner face of the endless steel belt.

In a further development of the invention, the inner side of the endless steel belt may be darkly browned.

The dark coloured heat-absorbing layer on the inner face of the endless steel belt may be an inorganic pigment, for example an iron oxide black.

Through this measure according to the invention, it is achieved that the heat absorption on the entire inner side of the endless steel belt is uniform, and therefore also the material to be treated is subjected to a uniform temperature.

Figure 2:
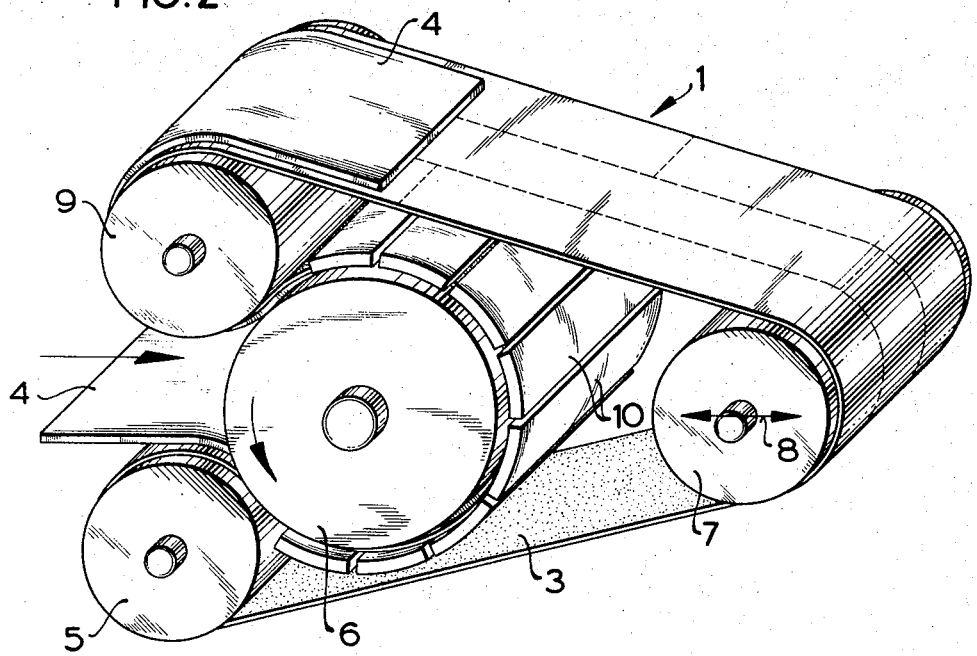

The invention is diagrammatically illustrated by way of example in the accompanying drawing, in which:

FIG. 1 shows an endless steel belt, for a rotary steel press, according to the invention, the inner face of which has been surface treated, and FIG. 2 shows a perspective view of the endless steel belt of FIG. 1 in a rotary press.

Referring to the drawing, an endless steel belt 1 is formed by longitudinally welding together three narrow steel belts 1a, 1b and 1c. The steel belts 1a, 1b and 1c were, prior to the longitudinal welding together, each transversely welded at a position 2. After the longitudinal welding has been effected, the upper and lower sides of the welds of the belt 1 so formed are polished smooth and the inner face of the endless belt 1 is coated with a dark coloured layer 3 which absorbs heat.

In the rotary press shown in FIG. 2, the material 4 to be treated is exposed to high temperature and pressure when passed between the endless steel belt 1, which is looped round a lower roll 5 and an upper roll 9 and a heated drum 6, around which drum 6 the belt is looped. The endless steel belt 1 is set under pressure by a roll 7, by means known per se, for example hydraulic rams which act in the direction of the arrow 8. The inner face of the endless steel belt 1 which bears the coating 3, while the endless steel belt 1 is looped around the drum 6, is heated up by heat radiation means 10, for example infra-red or quartz radiators, in order to raise the material to be pressed to a desired temperature. Since the inner face of the endless steel belt 1 has the dark coloured layer 3, it absorbs heat uniformly and thus the material to be pressed is heated uniformly over its entire cross-section, because the reflection of heat, produced by the heating device 10, from the endless steel belt 1 is completely uniform.

Due to the application of a dark heat-absorbing layer 3 onto the inner side of the endless steel belt 1, furthermore it is achieved that the endless steel belt 1 and the material 4 can be heated substantially more rapidly.

Comparison test carried out with a smoothly-polished endless steel belt and with a steel belt with a dark coloured heat-absorbing layer produced the following results:

| Steel belt with heat-absorbing layer | Steel belt without heat-absorbing layer |
|---|---|
| after 3 minutes to 120° C | after 4½ minutes to 120° C |
| after 6 minutes to 150° C | after 9½ minutes to 150° C |
| after 30 minutes to 260° C | after 70 minutes to 260° C |

From these tests it is clear that a rotary press with an endless steel belt provided on its inner face with a heat-absorbing layer, can be brought substantially more rapidly to the required working temperature, and that, due to the substantially better heat-transmission, correspondingly less heat energy is used, and thus it operates substantially more economically.

A further advantage is achieved in that the steel belt, which is provided with a heat-absorbing layer on its inner side, no longer requires to be protected, prior to use, with an anti-corrosion protective compound and therefore there is no need for the previously necessary operation of removing the anti-corrosion protective layer, before the press is set in operation.

It is particularly advantageous if the inner side of the endless steel belt is browned, that is to say bronzed or black finished, because such a browning hardly shows any wear phenomena. The heat-absorbing coating is advantageously an inorganic pigment, for example iron oxide black, because such pigments are unaffected by temperatures up to about 500°C.

What is claimed is:

1. A rotary press for the continuous temperature and pressure treatment of materials fed thereto comprising:

a. a heated drum, including radiant heating means adjacent said drum for heating the same by radiation, b. a plurality of rollers, including upper and lower rollers spaced partially above and below said heated drum at the inlet side thereof and a tension roller at the opposite side of said heated drum, said upper and lower rollers being positioned closely adjacent said heated drum for maintaining pressure on said material as it passes around said drum, the improvement comprising;

c. an endless steel belt looped around said rollers in pressure engagement with said material as it passes around in direct contact with said heated drum, said belt comprising a plurality of relatively narrow belt sections longitudinally welded at their adjoining edges, which edges are thereafter polished smooth for uniform, non-abrading contact with said material, and a dark coloured heat-absorbing coating provided on the entire inner face of said endless steel belt.

2. The rotary press of claim 1 wherein said coating on said steel belt is brown in color.

3. The rotary press of claim 1 wherein said dark colored coating is an inorganic pigment.

4. The rotary press of claim 3 wherein said inorganic pigment is iron oxide black.

* * * * *